(12) United States Patent
Vander Lind et al.

(10) Patent No.: US 9,230,714 B2
(45) Date of Patent: *Jan. 5, 2016

(54) HIGH STRENGTH WINDABLE ELECTROMECHANICAL TETHER WITH LOW FLUID DYNAMIC DRAG AND SYSTEM USING SAME

(71) Applicant: Google Inc., Mountain View, CA (US)

(72) Inventors: Damon Vander Lind, Oakland, CA (US); Jacob Felser, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/531,449

(22) Filed: Nov. 3, 2014

(65) Prior Publication Data

US 2015/0047875 A1  Feb. 19, 2015

Related U.S. Application Data

(63) Continuation of application No. 13/185,507, filed on Jul. 19, 2011, now Pat. No. 8,921,698.

(60) Provisional application No. 61/409,894, filed on Nov. 3, 2010, provisional application No. 61/365,655, filed on Jul. 19, 2010.

(51) Int. Cl.
*H01B 7/00* (2006.01)
*H01B 7/02* (2006.01)
*F03D 5/00* (2006.01)
(Continued)

(52) U.S. Cl.
CPC ............... *H01B 7/025* (2013.01); *D07B 1/147* (2013.01); *D07B 5/005* (2013.01); *F03D 5/00* (2013.01); *F03D 11/00* (2013.01); *H01B 7/043* (2013.01); *H01B 7/1815* (2013.01); *H01B 9/006* (2013.01); *H02G 11/00* (2013.01); *F05B 2240/917* (2013.01); *F05B 2240/921* (2013.01); *F05B 2240/922* (2013.01); *Y02E 10/70* (2013.01);
(Continued)

(58) Field of Classification Search
USPC .............. 174/102 R, 106 R, 107, 108, 110 R, 174/113 R, 115, 116, 117 R, 117 F, 117 FF
See application file for complete search history.

(56) References Cited

U.S. PATENT DOCUMENTS 2,953,627 A * 9/1960 Malneritch et al. ........ 174/102 R
3,261,907 A * 7/1966 Morrison ...................... 174/115
(Continued)

FOREIGN PATENT DOCUMENTS

WO    WO2013052178    4/2013

OTHER PUBLICATIONS

International Search Report prepared by the U.S. Patent Office in international patent application serial No. PCT/US2011/044539 mailed Nov. 25, 2011.

(Continued)

*Primary Examiner* — William H Mayo, III
(74) *Attorney, Agent, or Firm* — McDonnell Boehnen Hulbert & Berghoff LLP

(57) ABSTRACT

A tether, and system using such a tether, adapted to provide mechanical and electrical coupling of an airborne flying platform to the ground. The tether may have a center structural core with electrical conductors on or near the outer diameter of the tether. The tether may utilize exterior configurations adapted to reduce drag.

19 Claims, 8 Drawing Sheets

(51) Int. Cl.

| | | |
|---|---|---|
| *H01B 7/04* | (2006.01) | |
| *H02G 11/00* | (2006.01) | |
| *F03D 11/00* | (2006.01) | |
| *D07B 1/14* | (2006.01) | |
| *D07B 5/00* | (2006.01) | |
| *H01B 7/18* | (2006.01) | |
| *H01B 9/00* | (2006.01) | |

(52) U.S. Cl.
CPC .............. *Y02E 10/722* (2013.01); *Y02E 10/725* (2013.01); *Y02E 10/728* (2013.01)

(56) References Cited

U.S. PATENT DOCUMENTS

| | | | | |
|---|---|---|---|---|
| 3,602,632 | A * | 8/1971 | Ollis | 174/36 |
| 3,684,821 | A | 8/1972 | Miyauchi et al. | |
| 3,784,732 | A * | 1/1974 | Whitfill, Jr. | 174/108 |
| 4,110,554 | A * | 8/1978 | Moore et al. | 174/101.5 |
| 4,196,307 | A * | 4/1980 | Moore et al. | 174/47 |
| 4,251,040 | A | 2/1981 | Loyd | |
| 4,317,000 | A * | 2/1982 | Ferer | 174/70 R |
| 4,365,865 | A * | 12/1982 | Stiles | 385/101 |
| 4,440,974 | A * | 4/1984 | Naudet | 174/108 |
| 4,486,669 | A * | 12/1984 | Pugh | 290/44 |
| 4,659,940 | A * | 4/1987 | Shepard | 290/55 |
| 4,696,542 | A * | 9/1987 | Thompson | 385/108 |
| 4,842,221 | A | 6/1989 | Beach et al. | |
| 5,202,944 | A * | 4/1993 | Riordan | 385/101 |
| 5,274,725 | A | 12/1993 | Bottoms, Jr. et al. | |
| 5,495,547 | A * | 2/1996 | Rafie et al. | 385/101 |
| 5,813,106 | A * | 9/1998 | Haug et al. | 29/429 |
| 5,902,958 | A * | 5/1999 | Haxton | 174/47 |
| 6,072,245 | A * | 6/2000 | Ockels | 290/55 |
| 6,102,077 | A * | 8/2000 | Legallais et al. | 138/115 |
| 6,297,455 | B1 * | 10/2001 | Wijnberg et al. | 174/113 R |
| 6,392,151 | B1 * | 5/2002 | Rafie et al. | 174/106 R |
| 6,600,108 | B1 * | 7/2003 | Mydur et al. | 174/120 R |
| 6,781,254 | B2 * | 8/2004 | Roberts | 290/55 |
| 6,859,590 | B1 | 2/2005 | Zaccone et al. | |
| 7,462,781 | B2 * | 12/2008 | Varkey et al. | 174/102 R |
| 7,752,830 | B2 | 7/2010 | Goldwater et al. | |
| 8,350,403 | B2 * | 1/2013 | Carroll | 290/55 |
| 8,921,698 | B2 | 12/2014 | Vander Lind et al. | |
| 8,957,312 | B2 | 2/2015 | McCullough et al. | |
| 2005/0199415 | A1 | 9/2005 | Glew | |
| 2007/0209825 | A1 * | 9/2007 | Glew | G02B 6/4429 174/113 R |
| 2009/0289148 | A1 * | 11/2009 | Griffith et al. | 244/155 R |
| 2010/0026007 | A1 | 2/2010 | Bevirt | |
| 2010/0032947 | A1 | 2/2010 | Bevirt | |
| 2010/0032948 | A1 | 2/2010 | Bevirt | |
| 2010/0221112 | A1 | 9/2010 | Bevirt et al. | |
| 2010/0230546 | A1 | 9/2010 | Bevirt et al. | |
| 2010/0283253 | A1 | 11/2010 | Bevirt | |
| 2010/0295320 | A1 | 11/2010 | Bevirt | |
| 2010/0295321 | A1 | 11/2010 | Bevirt | |
| 2011/0042508 | A1 | 2/2011 | Bevirt et al. | |
| 2011/0042509 | A1 | 2/2011 | Bevirt et al. | |
| 2011/0042510 | A1 | 2/2011 | Bevirt et al. | |
| 2011/0121570 | A1 | 5/2011 | Bevirt et al. | |
| 2011/0127775 | A1 | 6/2011 | Bevirt | |
| 2011/0266395 | A1 | 11/2011 | Bevirt | |
| 2012/0286102 | A1 | 11/2012 | Sinha et al. | |
| 2012/0287274 | A1 | 11/2012 | Bevirt | |

OTHER PUBLICATIONS

Supplementary European Search Report prepared by the European Patent Office in Application No. EP 11 81 0283.9, mailed Sep. 1, 2015.

* cited by examiner

HIGH STRENGTH WINDABLE ELECTROMECHANICAL TETHER WITH LOW FLUID DYNAMIC DRAG AND SYSTEM USING SAME

CROSS-REFERENCE TO RELATED APPLICATIONS

This application claims priority to U.S. patent application Ser. No. 13/185,507 to Vander Lind filed Jul. 19, 2011, which in turn claims priority to U.S. Provisional Patent Application No. 61/365,655 to Vander Lind et al., filed Jul. 19, 2010 and to U.S. Provisional Patent Application No. 61/409,894 to Vander Lind, filed Nov. 3, 2010.

BACKGROUND

1. Field of the Invention

The present invention relates to high strength low drag tethers and systems using such tethers.

2. Description of Related Art

Some airborne wind energy systems, powered kites, tethered tidal power systems, moored platforms, tethered aerostats, and other tethered devices require high tether strength, significant tether power transmission, and are also sensitive to the effects of fluid-dynamic drag.

In the case of some airborne power generation systems, an aerial platform such as an airfoil may support an array of turbine driven generators. The platform may be linked to the ground with a tether which provides both the physical coupling as well as the electrical coupling of the tethered platform to the ground. In such a case, the electrical power generated by the turbine driven generators may travel along the tether from the aerial platform to the ground. In the case wherein the turbine driven generators also function as motor driven propellers, such as may be used when the platform is raised from the ground, the tether may provide electric power to the aerial platform. Also, the tether may be the conduit for telemetry related to control functions on the platform.

In addition, the tether provides the mechanical linkage of the platform to the ground. In the case of cross wind flying scenarios, such as when the aerial platform may be flying in patterns wherein the platform the apparent wind is much higher than the nominal actual wind speed, the drag of the tether may play a significant role in overall system function. Typically, the tether is wound on a reel of some sort either for storage of as part of the mechanical winching of the aerial platform.

What is called for is a tether, and system using a tether, that provides high strength for the support of an aerial platform from the ground. What is also called for is a tether that is low in drag such that it is suitable for support of airborne platforms.

SUMMARY OF THE INVENTION

A tether, and system using such a tether, adapted to provide mechanical and electrical coupling of an airborne flying platform to the ground. The tether may have a center structural core with electrical conductors on or near the outer diameter of the tether. The tether may utilize exterior configurations adapted to reduce drag.

DETAILED DESCRIPTION

Figure 1:
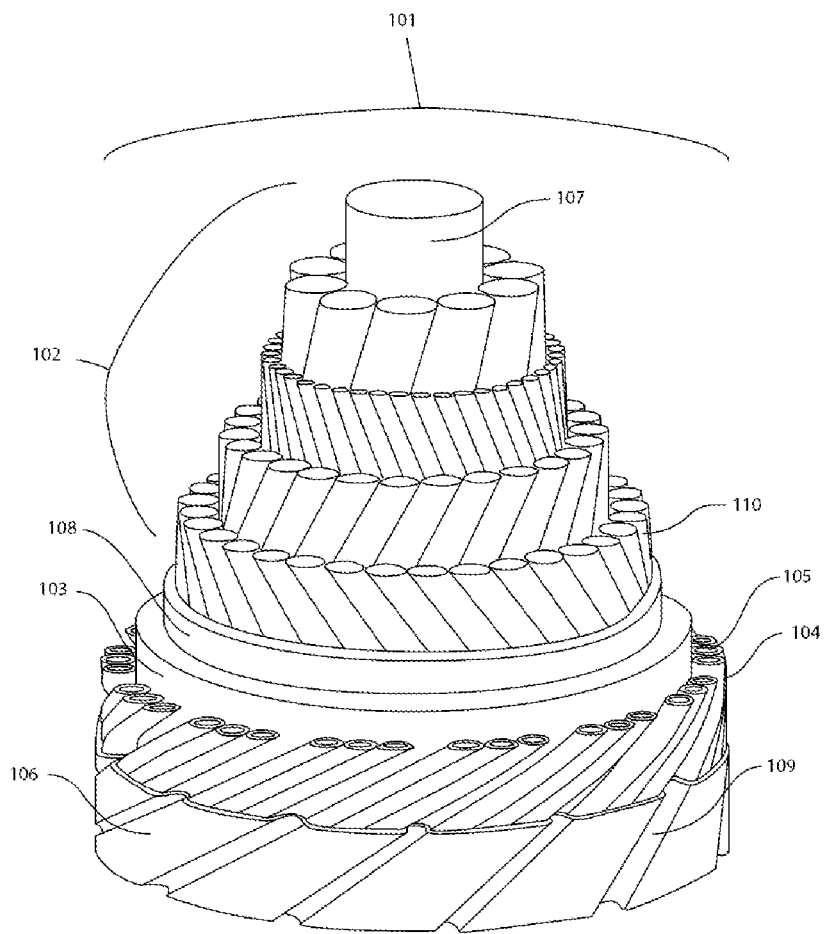
FIG. 1 is a diagram illustrating an embodiment of a high tensile strength electromechanical tether.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In some embodiments of the present invention, a high strength low drag electromechanical tether is adapted for use in a variety of applications, such as the coupling of an airborne power generation platform to the ground. In some embodiments, the tether comprises a high strength core made of individual composite rods wound in concentric layers of varying helical angle, a low bulk modulus material mounted concentrically about the high strength core, and individually or coaxially insulated electrical conductors helically wound or coaxially mounted about the low bulk modulus layer. The electrical conductors may be subject to heating while conducting electrical power, and the placement of the electrical conductors on or close to the outer diameter of the tether may enhance the cooling of the conductors in some aspects and reduce the temperature of the high strength core.

In some embodiments, the helical winding of the core high tensile strength material allows relative slip between neighboring strands, and thus decreases the minimum winding radius of the tether about a sheave, drum, or pulley, which is a desirable property for storage of the tether. Successive layers within the high strength core may be wound at opposing helical angles to reduce or eliminate the torque about the tether axis resultant from tension along the tether. The electrical conductors may be susceptible to excessive strain, and failure, as they may be of lower strength than the high strength core. A variety of design considerations may address this concern. The conductors may be wound in helix of somewhat steeper angle such that the helix may expand as a spring, instead of staining the conductors themselves. Also, the low bulk modulus material between the conductors and the high strength core serves to strain relieve the wires, allowing some compression and concurrent narrowing of the helix diameter of the electrical conductors when the tether is under tension. The use of the low bulk modulus material between the electrical conductors and the high strength core may allow a minimal wire helical angle and thus minimize the free length of wire, reducing weight and heating loss.

The external location of the wires additionally serves to decrease the temperature increase due to resistive loss in the wire, and to allow convenient placement of helical grooves in the tether surface in order to reduce the critical Reynolds number at which the coefficient of drag of the tether decreases. In some embodiments, the radial spacing of the conductors along external diameter of the tether, allows both enhanced cooling and reduced drag via the same design feature.

According to some embodiments of the present invention, an electromechanical tether used in airborne wind power systems, tethered tidal power systems, powered kites, moored platforms or other applications where high strength, long life, and low fluid-dynamic drag are necessary can be designed to incorporate elements that passively reduce fluid-dynamic drag on the tether, and also incorporate elements that reduce strain in the conducting element. A tether used in these applications may additionally be required to wind on to a small diameter drum or over a small diameter sheave. This requirement may be facilitated by the helical winding of the strands within the tether such that the average radius of each strand is close to that of the neutral axis of the tether under bending, such that each strand sees alternating compressive and tensile loads which may equilibrate through slip between neighboring strands. Successive layers may then be wound in opposite directions to balance the possible resultant torque about the tether axis under loading. As many high strength materials elongate greater than 1% of their free length at yield or break, and many good conductors elongate less than 0.4% at yield or break, the conductive elements of a materially efficient electromechanical tether may be configured to undergo significantly less strain than the high strength elements during use tethering an airborne system, and during winding onto a drum. Conductive elements may be relieved of strain by winding at a helical angle which is steep or far from the tether axis. Conductive elements may additionally be relieved of strain by inclusion of a low bulk modulus layers at a station within the winding radius of the conductive elements, such that the low bulk modulus layer compresses under the tension of the conductive elements, allowing some inward radial travel of the conductive elements, and thus reduces the required free length of the conductive elements. To reduce the effect of tether diameter on fluid dynamic drag, the outer surface of the tether may be dimpled or grooved so as to reduce the Reynolds number at which the cylindrical profile of the tether sees a reduction in coefficient of drag. In some embodiments, the drag reducing grooves may be located between neighboring conductors in a manner which incurs a minimal increase in tether diameter. In some embodiments, the grouping of conductors operating at similar voltage levels may allow the amount of insulation needed between neighboring conductors to be reduced.

In some embodiments of the present invention, a low-drag lightweight electromechanical tether 101 comprises a high strength core 102, a low bulk modulus material 103, an insulation material 104, conductors 105 and jacket 106. In various embodiments, the high strength core 102 is comprised of numerous composite rods or pultrusion elements wound in layers of varying and alternating helical angle. The composite rods of the high strength core 102 may comprise fibrous elements such as aramid fibers, carbon fibers, or glass fibers, and a constraining matrix element such as an epoxy matrix or a vinyl ester matrix. The helical winding of the outer layers of the high strength core 102 allows the whole tether 101, while in operation, to be wound onto a drum in a manner which induces finite slip or shear between neighboring rods. In various embodiments of the high strength core 102, successive coaxial layers of composite rods are wound in opposite helical directions to partially or fully balance the torque created by the tether under tension, or are wound in the same helical direction. In various embodiments, the high strength core 102 is comprised of dry fibers, metal wire, or metal cable rather than composite rods. In various embodiments, the center layer 107 of the high strength core 102 is comprised of axial composite rods, a lower modulus material which still provides tensile strength, a low-load filler material, communications lines, or any other appropriate filler material. In various embodiments, the high strength core 102 is comprised of rods of round, square, or trapezoidal cross section, or of rods of any other appropriate cross-sectional shape, or of rods of differing cross-sectional shape. In some embodiments, the individual elements may be coated with a coating adapted to facilitate slippage between the elements. This coating may be a Teflon coating, a PEEK coating, or any other appropriate low friction coating. In some embodiments, the layers may be coated with a coating, or layer, adapted to facilitate slippage between the layers. These low friction coatings may reduce friction as elements and/or layers move relative to each other when the tether is wound on a drum, for example. In some embodiments, a radial wrap of a low friction material is placed between each successive helical layer of the high strength core.

In some embodiments, each helically wound layer of the high strength core 102 is wrapped with a hoop strength or hoop tension layer 108. Although illustrated in FIG. 1 only as a single hoop tension layer, there may be a plurality of hoop tension layers of different diameters, which may each be wound around an individual layer in some aspects. In various embodiments, a hoop strength or hoop tension layer 108 comprises a high strength rigid material, or a tensile loaded layer such as a polyester film or high strength fiber wrap utilized to prevent layers of the high strength core 102 from becoming out-of-round or unwrapping from the core. In some embodiments, the hoop tension layer 108 is further utilized to reduce friction between composite rods in successive concentric layers of the high strength core 102. In some embodiments, the high strength core 102 is not made of concentric layers but instead is comprised of numerous elements in a radially symmetric pattern, which are each bound by, or compressed by, an element of hoop tension layer 108, for example each rod within high strength core 102 of the tether is comprised of a bundle of smaller rods. In some embodiments, each element in the various layers of the core 102, other than the center layer 107, are of the same diameter and construction. In some embodiments, all of the layers of the core 102 are of the same diameter. In some embodiments, the helix winding angle of each successive layer is increased viewed from the center of the tether outwards.

In some embodiments, the high strength core 102 of the tether 101 is contained within a concentric low bulk modulus layer 103, or is partially contained within the low bulk modulus layer 103, with some concentric helically wound outer layers 110 of the high strength core 102 inside of the low bulk modulus layer 103 and some outer layers 110 of the high strength core 102 inside of the low bulk modulus layer 103. In some embodiments, the low bulk modulus layer 103 serves to allow the conductors 105 to lie on a smaller radius shell within the tether 101 when the high strength core 102 stretches or when a stress is applied along the conductors 105, so as to limit conductor strain to within acceptable limits when the maximum allowable conductor strain is significantly below the maximum allowable core material strain. In embodiments in which low bulk modulus material 103 is located concentrically within the outer layers 110 of the high strength core 102, the outer layers 110 of the high strength core 102 aid in compressing the layer 103 at the expense of the outer layers 110 of the high strength core 102 carrying a lower proportion of the total tensile load on the tether 101. In some embodiments, the conductors 105 are wound at a helical angle or a radius which varies along the length of the tether 101 as a mechanism of strain reduction. Thus, in addition to the helical angle of the conductors 105 allowing for some strain relief of the conductors (when the core 102 is strained under load), as in the linear extension of an axially coiled spring, the relative softness of the bulk modulus layer 103 allows for a decrease in the diameter of the helix of the conductors when under load, allowing for strain relief through a second mechanism. The strain in conductors, thus reduced, may be a result of the stretching of the tether when under load in support of an airborne flying platform, or when wound around a drum. In some embodiments, low bulk modulus layer 103 is not included in tether 101. In some embodiments, other elements may reside within the tether 101. For example, command signal lines, whether electrically conductive or fiber optic, may be reside within the tether 101.

In some embodiments, an insulation material 104 insulates separate strands of conductors 105 electrically and mechanically. In some embodiments, separate elements of insulation material 104 insulate each strand or wire within conductors 105 such that each insulated conductor may slip relative to its neighbor when wound over a sheave or on a drum. In some embodiments, numerous elements of conductors 105 are embedded in a single element of insulation material 104, and the insulation material 104 sustains a shear strain when the tether 101 is wound over a sheave. In various embodiments, the conductors 105 comprise numerous wires of aluminum, copper, or any other conductive material, each of which may comprise single or multiple strands. In various embodiments, the conductors 105 are comprised of any number of individual wires or are comprised two or more concentric or coaxial layers separated by insulation, wound about the high strength core 102. In some embodiments, each element comprising the conductors 105 comprises a number of individual wires wound about either a hollow or low bulk modulus material to increase the strain along individual elements of the conductors 105 at which damage accumulates or material yielding occurs. In some embodiments, the insulation element 104 and low bulk modulus element 103 are the same element.

In various embodiments, the jacket 106 comprises a metal, a rubber, a plastic, a composite of fibers and a matrix, braided wires, or any other appropriate material or set of materials to contain and protect the other elements of the tether 101. In some embodiments, the jacket 106 is the same element as the insulation material 104.

In some embodiments, the jacket 106 has surface characteristics or shaping which reduce drag. In some embodiments, the jacket 106 has an aerodynamic profile such as that of an airfoil to reduce drag. In some embodiments, the jacket 106 has helical grooves 109 in concert with the gaps between the helically coiled groupings of conductors. The helical grooves 109 will reduce the drag of the tether, such as when used in support of an airborne flying platform.

Figure 2:
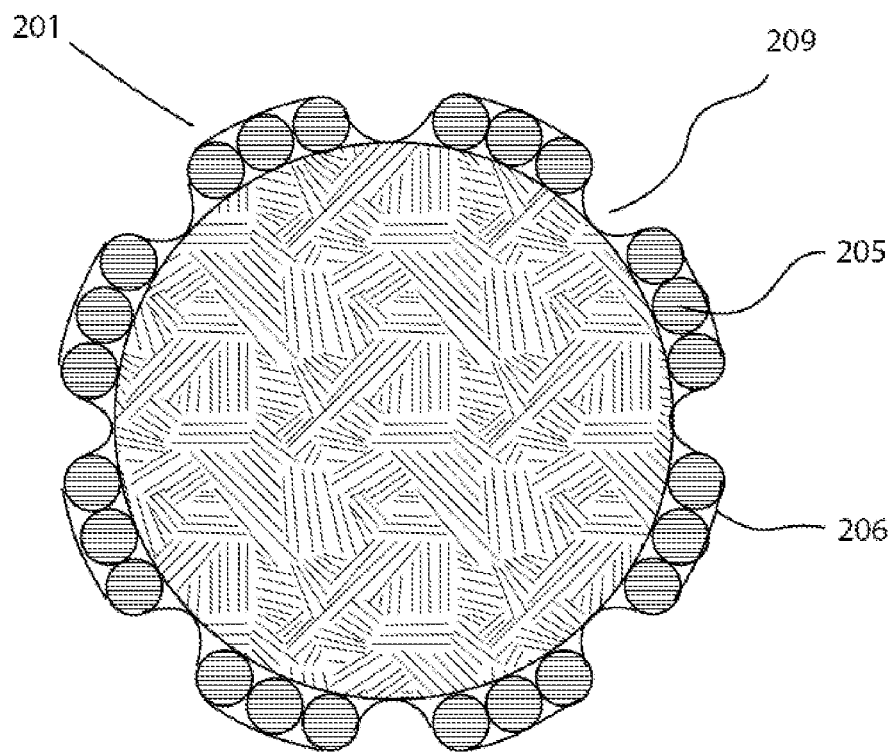
FIG. 2 is a diagram illustrating an embodiment of an electromechanical tether with bunched conductors, creating space for helical grooves.

FIG. 2 is a diagram illustrating an embodiment of an electromechanical tether with bunched conductors, creating space for helical grooves. In the example shown, a low drag lightweight electromechanical tether incorporates bunching of conductors 205 to allow space for boundary layer tripping elements 209 on the surface of the jacket 206 without significant diameter increase. In other embodiments, the tripping elements may comprise strakes, jagged edged grooves, or any other device which trips the boundary layer in the fluid flow about the tether to turbulence or introduces flow voracity prior to natural transition and thus increases the region of attached flow over the surface of the tether and thus reduces coefficient of drag. In some embodiments, elements 209 comprise individual strakes or divots in the surface of the jacket 206 such as the divots in a golf ball or flush surface vortex generators, such as triangular divots. In one embodiment, the elements 209 are not flush with the surface of the jacket 206, but press flush with the surface of the jacket 206 under pressure to allow winding on a drum. In some embodiments, the elements 209 are selected in size and spacing according to the operating Reynolds number of the tether 201 to minimize drag, noise, unsteady dynamics, or some combination thereof at one or a range of operating conditions for the tether. In some embodiments, the boundary layer tripping elements 209 are placed on the outside of the tether 201 at a station with a known orientation relative to the external flow. In some embodiments the surface of tether 201 is smooth or has a uniform roughness. In some embodiments, each conductor within a grouping of conductors operates at the same voltage, to minimize the required insulation thickness.

Figure 3:
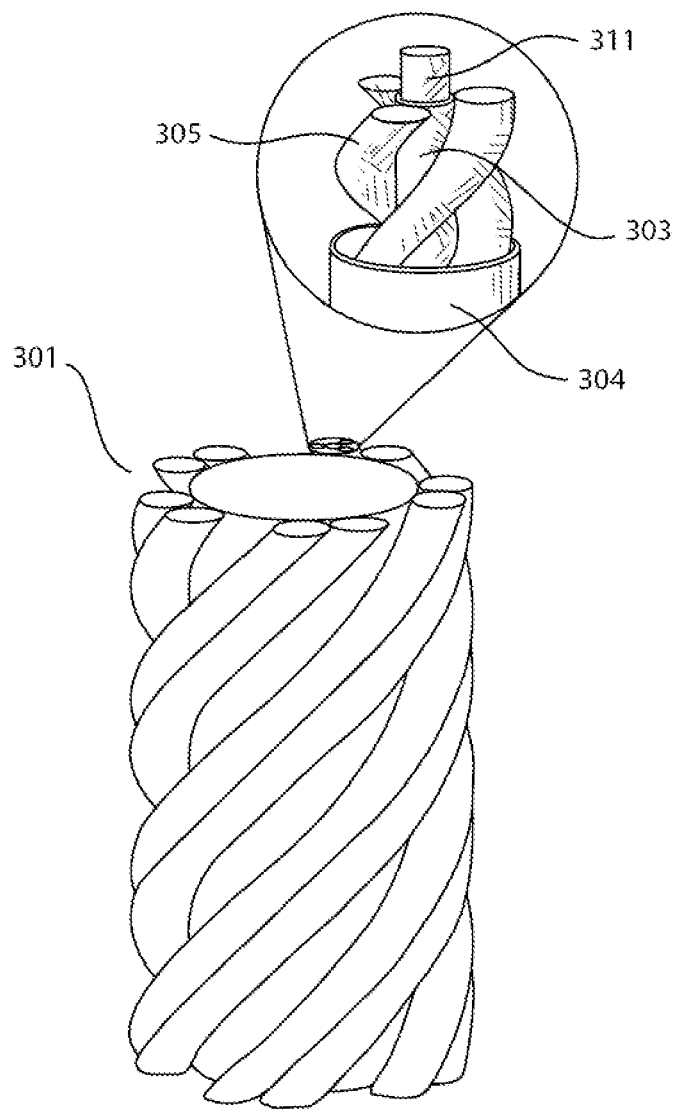
FIG. 3 is a diagram illustrating an embodiment of an electromechanical tether incorporating secondary strain relief of conductive elements in the tether.

FIG. 3 is a diagram illustrating an embodiment of a low drag lightweight electromechanical tether 301 incorporating secondary strain relief of conductive elements in the tether. In the example shown, the tether 301 comprises high strength composite rods 311 which are concentrically surrounded by low bulk modulus material 303, conductors 305, and insulation material 304. In some embodiments, the rods 311 are electrically insulated from conductors 305. In some embodiments, the rods 311 are not insulated from the conductors 305 but are insulated from other conductive elements within the tether termination. In some embodiments, the conductors 305 comprise a number of individually insulated wires wound about the high strength composite rods 311.

Figure 4:
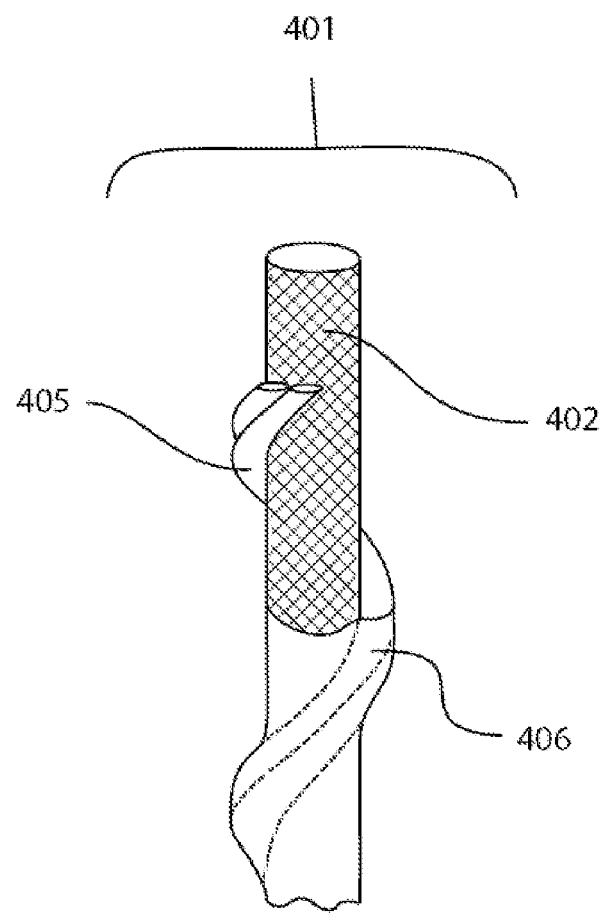
FIG. 4 is a diagram illustrating an embodiment of a specific example of an electromechanical tether incorporating two conductive elements and a jacket which serves as a low bulk modulus material.

FIG. 4 is a diagram illustrating an embodiment of a low drag lightweight electromechanical tether. In the example shown, the tether 401 has a length of 100 meters, comprising a high strength core 402, which may be braided aramid fibers. This example further comprises conductors 405, and a jacket 406. The conductors 405 comprise two individually insulated braided 16 AWG copper wires. The jacket 406 comprises a compressively biased vinyl sheath, which serves to locate and compress the conductors 405. When the tether 401 is not under tension, the combination of compressive loading in the conductors 405 and compliance in the jacket 406 serve as the equivalent of the low bulk modulus layers 102, 203, and 303 seen in other embodiments, in reducing the change in lay length of the conductors 405 through the change in length of the high strength core 402 over a range of tensions.

Figure 5:
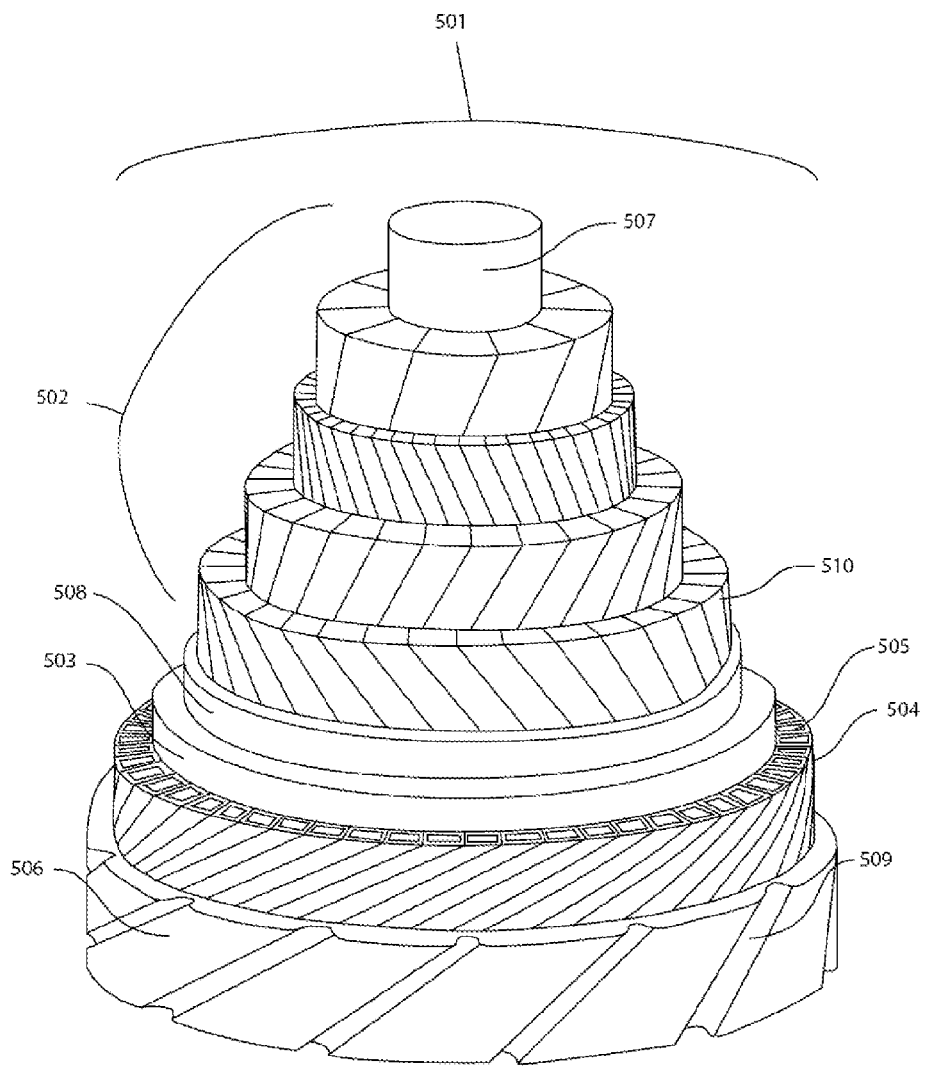
FIG. 5 is a diagram illustrating an embodiment of an electromechanical tether incorporating strength members and conductors of alternate cross sectional configurations.

In some embodiments of the present invention, as seen in FIG. 5 a low drag lightweight electromechanical tether 501 is shown wherein the layers are of rectangular cross-section. In this embodiment, the tether 501, which may have a length of 500 meters, comprises a multi-layered, high strength core 502. Each layer of high strength core 502, for example layer 510, may comprise a number of individual carbon fiber pultrusions of square or rectangular cross section, which are designed to make the high strength core 502 have a smaller diameter than an equivalent high strength core built of cylindrical rods, as the packing factor is higher compared to layers of cylindrical elements. In some embodiments, each carbon fiber pultrusion in the high strength core 502 is pultruded along a helical path to eliminate latent stresses when assembled into the tether 501. In one example, each pultrusion has a major cross sectional dimension of between 3 and 5 millimeters.

As the helical angle of layer 510 is small, the stresses in individual carbon fiber pultrusions due to the twist over length are low. In some embodiments, each carbon fiber pultrusion in high strength core 502 is pultruded along a helical path to further reduce latent stresses in tether 501. In this example, each pultrusion has a major cross sectional dimension of between 3 and 5 millimeters. Tether 501 further comprises hoop tension layer 508, which prevents dislocation of individual pultrusions within high strength core 502 in handling, bending, or under low tension. The tether 501 may have a hoop tension layer 508, which may be an aramid weave impregnated in vinyl rubber. The hoop tension layer 508 is wrapped with a low bulk modulus layer 503, which comprises a low firmness foam rubber rigidly bonded to both the hoop tension layer 508 and the insulation 504. The conductors 505 may comprise a number of identical solid copper wires of square cross section each individually insulated with insulation material 504. The insulation material 504 may comprise a die extruded layer of PVC about each conductive element of the conductors 505. The conductors 505 may be grouped into two groups, one of which has an operating voltage of 5000 volts, and the other of which has an operating voltage of 0 volts. The conductors 505 are bound by the jacket 506, which may comprise helical grooves 509. The jacket 506 may comprise die-extruded vinyl rubber over an aramid weave. The helical grooves 509 are cut into the jacket 506 in some embodiments, and are of geometric dimensions suitable for the typical operating Reynolds numbers of the tether 501. For example, the helical grooves 509 may be of a semicircular cross section of depth 1 millimeter and width 2 millimeters, spaced every 10 millimeters along the circumference of tether 501.

In some embodiments, the tether is adapted to support an airborne power generation system of an airfoil with turbine driven generators. The drag of the tether may be minimized relative to the drag of the tethered airborne system, within the constraints of requirements for strength and electrical conductivity. The overall coefficient of drag of the tether, referenced to the wing area, can range from around 0.03 to 0.15. In such a case, the tether acts as if the wing has that much higher of a coefficient of drag. Referenced to its own cross section, the tether may have a coefficient of drag of around 1.2 for a smooth cylinder, whereas the grooves or dimples can bring that number down to approximately 0.6 for a large range of Reynolds numbers, or as low as 0.45 for narrow ranges of Reynolds numbers. In some aspects, larger grooves will cause a drag reduction at lower Reynolds number, but only a relatively smaller reduction. Smaller grooves may cause reduction of the coefficient of drag at higher Reynolds numbers, and may cause a more significant reduction.

Figure 6:
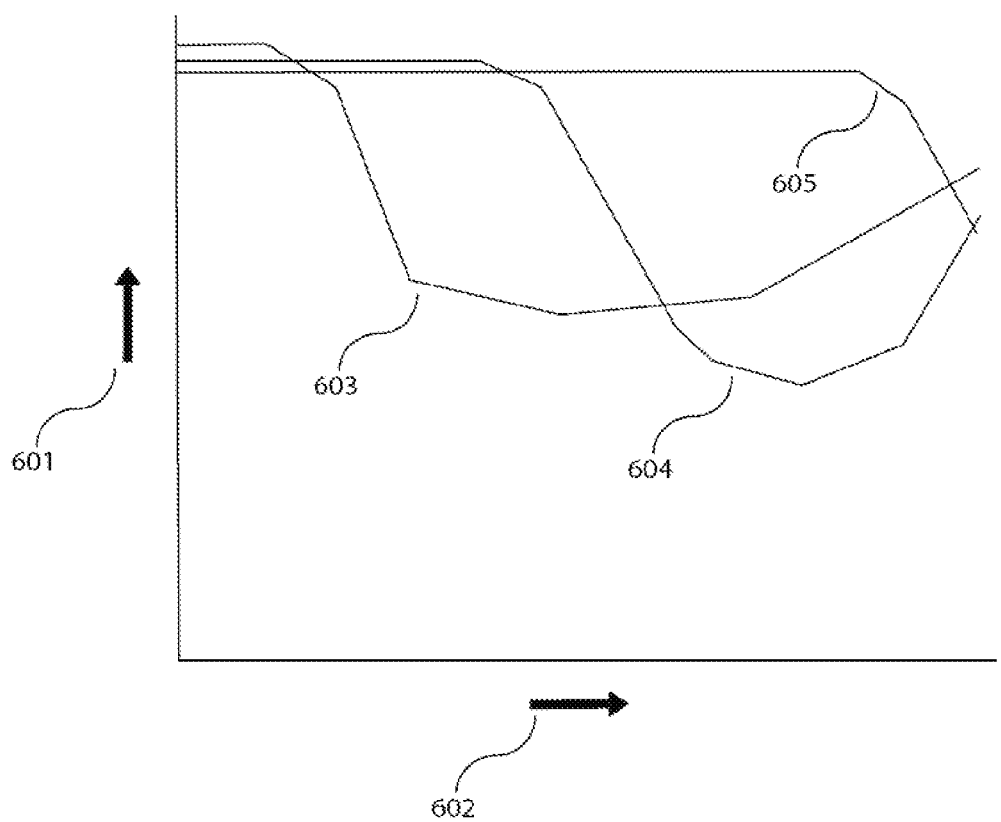
FIG. 6 is a graph of tether properties according to some embodiments of the present invention.

FIG. 6 is a graph depicting the coefficient of drag of various embodiments of the tether, plotted on axis 601, as a function of tether Reynolds number, which is plotted along axis 602. The first curve 603 depicts the coefficient of drag of an embodiment of a tether with relatively larger surface grooves. The second curve 604 depicts the coefficient of drag of an embodiment of a tether with smaller surface grooves. The third curve 605 depicts the coefficient of drag of an embodiment of a tether with a smooth surface. When the invention is used to moor an airborne wind turbine, the speed of the airborne wind turbine must be kept below a maximum level in high wind situations. Surface shapes such as the helical grooves depicted on jacket 106 in FIG. 1, which result in coefficient of drag curves such as the first curve 603 and the second curve 604, increase in coefficient of drag at high speeds and thus aid in maintaining the airborne wind turbine below a maximum velocity. As seen in the first and second curves 603, 604, at higher Reynolds numbers (which in this example would indicate higher speeds) the low coefficient of drag begins to raise. Thus, a tether may be outfitted with a surface, such as helical grooves, which bring about a desired reduction in drag at preferred operational apparent wind speeds, but then also brings about a desired increase in drag at apparent wind speeds above preferred speeds. This effect serves the design by increasing drag at apparent wind speeds above desired speeds.

Many jacket surface treatments, again such as the helical grooves depicted in jacket 106, also show increased in drag at low speeds, before the dip in drag at the middle speeds. In some embodiments of the preset invention, the helical grooves on jacket 106 are spaced and sized such that the increase in coefficient of drag at low speeds lies below the minimum preferred operational apparent flight speed of the airborne wind turbine. In the case of cross wind flying regimes, the apparent wind speed may be significantly higher than the ambient wind speed. In some embodiments, different surface shapes are utilized at different locations along the length of the tether, such as near the base and near the top of the tether, to match the apparent wind speeds at each location. In some embodiments, only the segment of the tether closest to the aerial platform is shaped to reduce drag.

In some embodiments, helical grooves are not cut into the surface of the tether and instead helical strakes, linear strakes, dimples, or some other boundary layer tripping mechanism is utilized to achieve low drag in the operating envelope.

Figure 7:
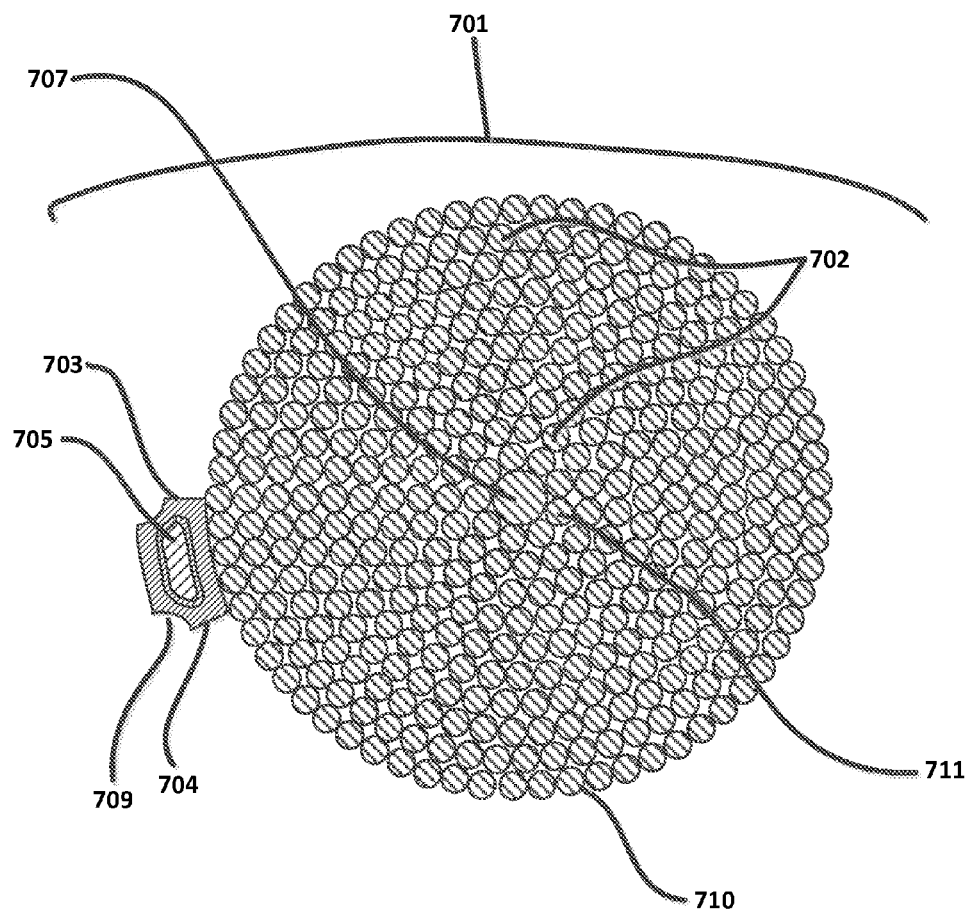
FIG. 7 is a cross-sectional view of a tether according to some embodiments of the present invention.

In some embodiments of the present invention, as seen in FIG. 7, a tether may be used as the tether for a 400 kW airborne wind turbine. This tether 701 may be designed to withstand 300 kN of force at a safety factor of 2. The tether 701 may have 370 strands of carbon fiber 1 mm pultrusion 711, in layers 702 of alternating helical angle. The inner strand (the 371st) core 707 is 2 mm in diameter. The helical angle on each successive layer increases starting at 1 degree at the first layer closest to the core 707 and increasing to 5 degrees on the outermost layer 710. The pultrusions are of intermediate modulus carbon fiber. There are 10 layers 702 outside of the core. All layers are coated in teflon to reduce friction on winding. The innermost layer 711 has a helical angle of 1 degree, and the outermost layer 710 has a helical angle of 5 degrees. Intermediate layers have helical angles which increase roughly linearly from that of innermost later 711 to outermost layer 710, but which are adjusted slightly to minimize torque about the tether base due to tension. The outermost layer 710 is wound at a helical angle approximately 1 degree larger than that of a zero-torque design to allow for free-spinning of the tether base about a bearing as the airborne wind turbine flies a circular flightpath. While the bearing drag at the base of the tether is not consistent over the life of the bearing, and has some nonlinear dependence on load on the tether, the added helical angle on the outermost layer 710 is set to match the average torque per tensile load from the bearing over its operating life.

Outside of these layers lie the conductors 705, which are insulated with two layers of insulation: the inner insulation layer 704 of FEP, and the outer insulation layer 703 of medium durometer PVC. In each conductor portion are three wires, each individually insulated with FEP. In some embodiments, the conductor portions are helically wrapped with the opposite chirality of outermost layer 710. The wires 705 may comprise strands of aluminum conductor and are rolled to the pictured cross-sectional shape and annealed prior to insulation with FEP insulation 704. In some embodiments, the FEP insulation 704 is approximately 0.2 mm thick, and designed to provide the primary electrical barrier for wires 705 which convey DC current at approximately 5000 volts.

The silicone layers are extruded through a die which chamfers the edges 709 such that when all wires are bonded together about the outside of the core, there are helical grooves remaining in the surface. The helical grooves are roughly 2 mm deep and 16 in count about the perimeter. Although only a single insulated conductor is shown in FIG. 7 for purposes of illustration, there would be a continuous layer of insulated conductors around the periphery of the tether. Because of the adjacent chamfered edges 709, the edges combine to form a groove. The insulated conductors are wound in a helix about the carbon strands, thus resulting in a helical groove around the tether. In assembly, all 16 jackets are fused with heat to create a single uniform solid jacket.

Figure 8:
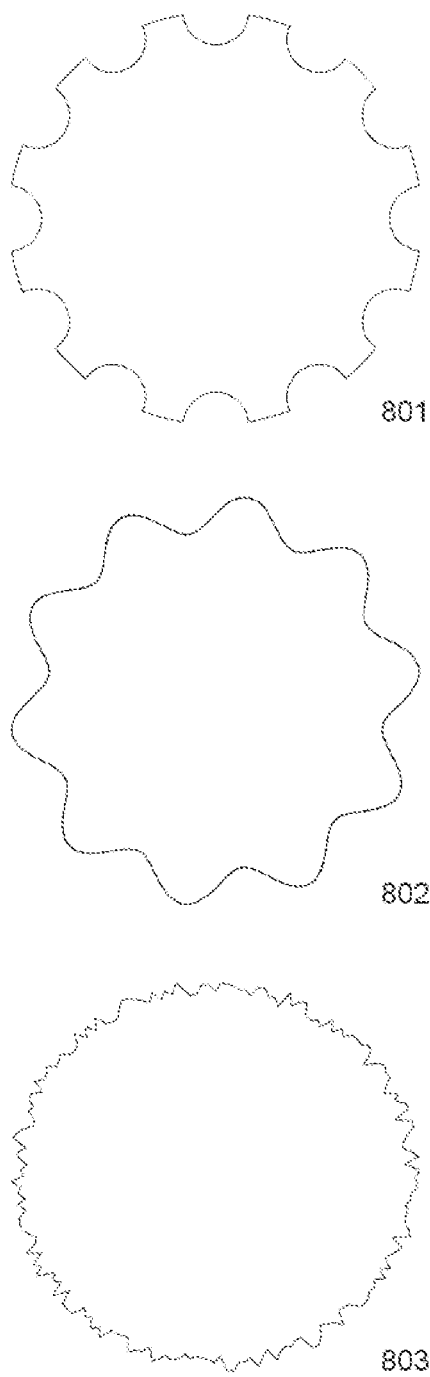
FIG. 8 illustrates various external configurations according to some embodiments of the present invention.

FIG. 8 illustrates the cross-sectional shapes of various possible embodiments of a low drag lightweight electromechanical tether, such as tether 101 of FIG. 1, tether 201 of FIG. 2, or the tethers whose measured drag coefficient profiles are presented in FIG. 6. In various embodiments, the tether comprises a surface cross-sectional shape 801 with a number of hemispherical cuts along its circumference, a surface cross-sectional shape 802 of oscillating radius, a surface cross-sectional shape 803 with surface imperfections such as those introduced by sand blasting, or any other appropriate tether. In some embodiments, the tether is of some other shape that results in an increase in coefficient of drag above a cut-off Reynolds number or speed. In some embodiments, the tether deforms above a cut-off flight speed or above a cut-off tension such that the modified shape results in an increase in the tether drag coefficient. In higher wind speeds and at higher flight speeds, a larger segment of the tether of a crosswind kite system experiences apparent winds above any given cut-off speed. In some embodiments, the tether comprises a surface cross-sectional shape which exhibits a reduction in coefficient of drag above some speed or Reynolds number (e.g. shape 801 or shape 803). In some embodiments, the tether comprises such a cross-sectional shape only over a segment of the tether near the kite, such that the increased apparent wind on the tether near the ground attachment point does not contribute to a reduction in tether drag coefficient as the inertial wind speed or kite speed increase.

As evident from the above description, a wide variety of embodiments may be configured from the description given herein and additional advantages and modifications will readily occur to those skilled in the art. The invention in its broader aspects is, therefore, not limited to the specific details and illustrative examples shown and described. Accordingly, departures from such details may be made without departing from the spirit or scope of the applicant's general invention.

What is claimed is:

1. A high strength tether adapted for electrical conduction and tensile loading, said tether comprising:
    a central core, wherein the central core comprises a center layer, and wherein the center layer comprises an axial rod;
    a low bulk modulus strain relief layer concentrically surrounding the central core; and
    a plurality of electrical conductors, said plurality of conductors located along the exterior of the low bulk modulus strain relief layer.

2. The high strength tether of claim 1 wherein said plurality of electrical conductors are helically wound along the exterior of the low bulk modulus strain relief layer.

3. The high strength tether of claim 2 wherein said plurality of electrical conductors are separated into a plurality of helically wound groups of one or more conductors defining helical spaces between said helically wound groups of one or more conductors along the exterior surface of said tether.

4. The high strength tether of claim 3 wherein each of said plurality of helically wound groups of one or more conductors are wound around a strength element.

5. The high strength tether of claim 4 wherein said strength element is a composite rod.

6. The high strength tether of claim 1 further comprising an outer sheath layer, said outer sheath layer comprising a plurality of boundary layer tripping features.

7. The high strength tether of claim 1 wherein the center layer axial rod comprises a composite material.

8. The high strength tether of claim 7 wherein the composite material comprises carbon fibers and a constraining matrix element.

9. The high strength tether of claim 7 wherein the center layer is of cylindrical cross-section.

10. A system for power generation with a tethered kite, said system comprising:
    a ground station;
    a kite, said kite comprising:
        a main wing; and
        a plurality of turbine driven generators; and
        a tether, said tether attached to said ground station on a first end and to a kite on a second end, said tether comprising:
            a central core, wherein the central core comprises a center layer, and wherein the center layer comprises an axial rod;
            a low bulk modulus strain relief layer concentrically surrounding the central core; and
            a plurality of electrical conductors, said plurality of conductors located along the exterior of the low bulk modulus strain relief layer.

11. The system of claim 10 wherein said plurality of electrical conductors are helically wound along the exterior of the low bulk modulus strain relief layer.

12. The system of claim 11 wherein said plurality of electrical conductors are separated into a plurality of helically wound groups of one or more conductors defining helical spaces between said helically wound groups of one or more conductors along the exterior surface of said tether.

13. The system of claim 12 wherein each of said plurality of helically wound groups of one or more conductors are wound around a strength element.

14. The system of claim 13 wherein said strength element is a composite rod.

15. The system of claim 10 further comprising an outer sheath layer, said outer sheath layer comprising a plurality of boundary layer tripping features.

16. The system of claim 10 wherein the center layer axial rod comprises a composite material.

17. The system of claim 16 wherein the composite material comprises carbon fibers and a constraining matrix element.

18. The system of claim 16 wherein the center layer is of cylindrical cross-section.

19. A high strength tether adapted for electrical conduction and tensile loading, said tether comprising:

a central core, wherein the central core comprises a center layer;
a low bulk modulus strain relief layer concentrically surrounding the central core; and
a plurality of electrical conductors, said plurality of conductors located along the exterior of the low bulk modulus strain relief layer.

\* \* \* \* \*